(12) United States Patent
Tung et al.

(10) Patent No.: US 12,401,271 B2
(45) Date of Patent: Aug. 26, 2025

(54) TOTEM-POLE POWER FACTOR CORRECTOR WITH ZERO-VOLTAGE SWITCHING

(71) Applicant: DELTA ELECTRONICS, INC., Taoyuan (TW)

(72) Inventors: Feng-Hsuan Tung, Taoyuan (TW); Terng-Wei Tsai, Taoyuan (TW); Chia-Hsiong Huang, Taoyuan (TW); Yu-Jen Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 213 days.

(21) Appl. No.: 18/331,832

(22) Filed: Jun. 8, 2023

(65) Prior Publication Data
US 2024/0275274 A1    Aug. 15, 2024

(30) Foreign Application Priority Data
Feb. 15, 2023  (CN) .......................... 202310116648.4

(51) Int. Cl.
  *H02M 1/42*   (2007.01)
  *H02M 1/00*   (2007.01)
(52) U.S. Cl.
  CPC ....... *H02M 1/4225* (2013.01); *H02M 1/0058* (2021.05); *H02M 1/4241* (2013.01)
(58) Field of Classification Search
  CPC . H02M 1/0058; H02M 1/4225; H02M 1/4241
  See application file for complete search history.

(56) References Cited

U.S. PATENT DOCUMENTS 10,217,559 B2    2/2019  Yang et al.
10,447,143 B2 *  10/2019  Rainer .................... H02M 3/07
(Continued)

FOREIGN PATENT DOCUMENTS

CN    101018017 A    8/2007
CN    105393447 A    3/2016
(Continued)

OTHER PUBLICATIONS

Action dated Sep. 5, 2023 of the related Taiwan patent application No. 112105308.
Huang, Qingyun et al: "3kw Four-Level Flying Capacitor Totem-Pole Bridgeless PFC Rectifier with 200V GaN Devices", 2019 IEEE Energy Conversion Congress and Exposition (ECCE), IEEE, Sep. 29, 2019, pp. 81-88, Figs. 1-5.
(Continued)

*Primary Examiner* — Gary A Nash
(74) *Attorney, Agent, or Firm* — Muncy, Geissler, Olds & Lowe, P.C.

(57) ABSTRACT

A Totem-pole power factor corrector receives an input power source and convert the input power source into an output power source. The Totem-pole power factor corrector includes an input inductor, a fast-switching switch leg, a slow-switching switch leg, a resonant tank, and an output capacitor. The fast-switching switch leg includes a fast-switching upper switch and a fast-switching lower switch, and the fast-switching upper switch and the fast-switching lower switch are commonly coupled at a first middle node. The slow-switching switch leg is coupled in parallel to the fast-switching switch leg, and the slow-switching switch leg includes a slow-switching upper and a slow-switching lower switch. The resonant tank includes a resonant inductor and at least one resonant capacitor. A first end of the resonant inductor is coupled to the first middle node, and a second end of the resonant inductor is coupled to the at least one capacitor.

9 Claims, 5 Drawing Sheets

(56) References Cited

U.S. PATENT DOCUMENTS

| | | |
|---|---|---|
| 10,505,459 B2 | 12/2019 | Murakami et al. |
| 11,011,936 B2 | 5/2021 | Costinett et al. |
| 11,575,315 B2 | 2/2023 | Fu et al. |
| 2014/0355319 A1* | 12/2014 | Cohen ............ H02M 7/217 363/126 |
| 2015/0009734 A1 | 1/2015 | Stahl et al. |
| 2015/0263605 A1* | 9/2015 | Alam ............ H02M 3/33546 363/21.02 |
| 2015/0303813 A1* | 10/2015 | Cheng ............ H02M 1/4258 363/21.02 |
| 2017/0290114 A1 | 10/2017 | Glaser et al. |
| 2017/0338748 A1 | 11/2017 | Liang et al. |
| 2018/0278177 A1 | 9/2018 | Glovinsky et al. |
| 2022/0021297 A1* | 1/2022 | Xu ............ H02M 1/4233 |
| 2022/0069722 A1 | 3/2022 | Pan |
| 2022/0247303 A1 | 8/2022 | Jin et al. |
| 2022/0360196 A1 | 11/2022 | Ilic et al. |
| 2023/0006540 A1 | 1/2023 | Wang et al. |
| 2024/0162831 A1 | 5/2024 | Mukherjee et al. |

FOREIGN PATENT DOCUMENTS

| | | |
|---|---|---|
| CN | 109921646 A | 6/2019 |
| CN | 110089020 B | 4/2021 |
| CN | 111654196 B | 9/2021 |
| CN | 112803746 B | 4/2022 |
| TW | 201633282 A | 9/2016 |
| TW | 202211604 A | 3/2022 |
| TW | 202211605 A | 3/2022 |

OTHER PUBLICATIONS

In-Hwan Oh Ed—Anonymous: "A soft-switching synchronous buck converter for Zero Voltage Switching (ZVS) in light and full load conditions" Applied Power Electronics Conference and Exposition, 2008, APEC 2008. Twenty-Third Annual IEEE, Piscataway, NJ, USA, Feb. 24, 2008, pp. 1460-1464; pp. 753, Figs. 1, 3.

Lin, Bor-Ren et al: "Resonant converter with flying capacitors—Analysis and Experiments", 2014 9th IEEE Conference On Industrial Electronics and Applications, IEEE, Jun. 9, 2014, pp. 161-166, Fig. 1.

Kai Dong et al: "A GaN Totem-Pole PFC Converter with Zero-Voltage-Switching PWM Control", 2021 IEEE Applied Power Electronics Conference and Exposition (APEC), IEEE, Jun. 14, 2021, pp. 247-251, abstract, Figs. 2(a), 2(b).

N.Z. Yahaya et al: "Design and Simulation of an Improved Soft-Switched Synchronous Buck Converter", Modelling&Simulation, 2009. AMS '09. Third Asia International Conference On, IEEE, Piscataway, NJ, USA, May 25, 2009, pp. 751-756, pp. 1460-1461; Fig. 1.

Search Report dated Nov. 29, 2023 of the corresponding related European patent application No. 23179269.8.

Search Report dated Nov. 9, 2023 of the corresponding European patent application No. 23177904.2.

Office Action dated Mar. 4, 2024 of the corresponding Taiwan patent application No. 112105302.

Office Action dated May 5, 2025 of the relating U.S. Appl. No. 18/331,383.

* cited by examiner

TOTEM-POLE POWER FACTOR CORRECTOR WITH ZERO-VOLTAGE SWITCHING

BACKGROUND

Technical Field

The present disclosure relates to a Totem-Pole power factor corrector, and more particularly to a Totem-Pole power factor corrector with zero-voltage switching.

Description of Related Art

The statements in this section merely provide background information related to the present disclosure and do not necessarily constitute prior art.

For a Totem-Pole power factor corrector (TPPFC), traditionally, the power density is increased by increasing the switching frequency. However, under the continuous conduction mode (CCM) in the conventional approach, it must be used to reduce heat generation since the heat generated by the hard switching of the switches increases with the switching frequency. However, due to the reduction of the switching frequency, although the generation of heat energy can be reduced, the effect of reducing the volume of the magnetic component cannot be achieved. Therefore, the operation mode of critical conduction mode (CRM) is proposed, which has the characteristics of zero-voltage switching (ZVS), thereby improving the operation frequency and increasing the efficiency. However, this operation mode (CRM) has following disadvantages:

1. The drastic frequency change makes the control more difficult, and the total input harmonic distortion (THD) is higher.

2. The high-frequency ripple and the low-frequency main power components exist at the same time so that it is not easy to design the filtering function of magnetic components.

3. Since the peak current in CRM operation is twice that of conventional CCM, the volume of the magnetic component needs to be larger.

4. Due to the large input ripple, if only a single-leg switch operates, a larger electromagnetic interference inductor (EMI choke) is required so the advantage of size will be lost. Therefore, two-phase interleaved operation is often used to solve this problem, but this increases the cost and control complexity, resulting in the problem of using multiple switches for low power.

Therefore, the present disclosure provides a Totem-Pole power factor corrector with zero-voltage switching to add at least one set of LC resonant tank to the circuit structure of the existing Totem-Pole power factor corrector (TPPFC), thereby solving the disadvantages of the existing technology under the continuous conduction mode (CCM) operation.

SUMMARY

An objective of the present disclosure is to provide a Totem-Pole power factor corrector with zero-voltage switching to solve the problems of existing technology.

In order to achieve the above-mentioned objective, the Totem-Pole power factor corrector with zero-voltage switching receives an input power source and converts the input power source into an output power source. The Totem-Pole power factor corrector includes an input inductor, a fast-switching switch leg, a slow-switching switch leg, a resonant tank, and an output capacitor. A first end of the input inductor receives the input power source. The fast-switching switch leg includes a fast-switching upper switch and a fast-switching lower switch, and the fast-switching upper switch and the fast-switching lower switch are commonly coupled at a first middle node. The slow-switching switch leg is coupled in parallel to the fast-switching switch leg, and the slow-switching switch leg includes a slow-switching upper switch and a slow-switching lower switch. The resonant tank includes a resonant inductor and at least one resonant capacitor. A first end of the resonant inductor is coupled to the first middle node, and a second end of the resonant inductor is coupled to the at least one resonant capacitor. The output capacitor is coupled in parallel to the fast-switching switch leg, and outputs the output power source.

In one embodiment, the number of the at least one resonant capacitor is one; a first end of the resonant capacitor is coupled to the second end of the resonant inductor, and a second end of the resonant capacitor is coupled to the fast-switching upper switch and the slow-switching upper switch.

In one embodiment, the number of the at least one resonant capacitor is one; a first end of the resonant capacitor is coupled to the second end of the resonant inductor, and a second end of the resonant capacitor is coupled to the fast-switching lower switch and the slow-switching lower switch.

In one embodiment, the number of the at least one resonant capacitor is two, which are a first resonant capacitor and a second resonant capacitor; a first end of the first resonant capacitor and a first end of the second resonant capacitor are coupled to the second end of the resonant inductor; a second end of the first resonant capacitor is coupled to the fast-switching lower switch and the slow-switching lower switch; a second end of the second resonant capacitor is coupled to the fast-switching upper switch and the slow-switching upper switch.

In one embodiment, a first end of the fast-switching upper switch and a first end of the fast-switching lower switch are commonly coupled to the first middle node; a first end of the slow-switching upper switch and a first end of the slow-switching lower switch are commonly coupled to the input power source; a second end of the fast-switching upper switch is coupled to a first end of the slow-switching upper switch; a second end of the fast-switching lower switch is coupled to a second end of the slow-switching lower switch.

In one embodiment, the input inductor and the resonant inductor form an integrated coupling structure.

In one embodiment, the Totem-Pole power factor corrector operates in a N-phase structure. The N-phase Totem-Pole power factor corrector includes N sets of the input inductors, N sets of the fast-switching switch legs, and N sets of the resonant tanks, and one set of the slow-switching switch leg and one set of the output capacitor.

In one embodiment, the input inductor in each phase is correspondingly coupled with the resonant inductor of the resonant tank.

In one embodiment, the two resonant inductors between two phases are cross-coupled.

Accordingly, the Totem-pole power factor corrector with zero-voltage switching of the present disclosure has following advantages: 1. The LC resonant tank is added to make the Totem-Pole power factor corrector have full switch zero-voltage switching function, thereby reducing switching loss to increase power conversion efficiency; 2. The LC resonant tank is added to accelerate the release of the electric energy stored in the parasitic capacitance of the switch, thereby suppressing the surge when the switch is switched to protect the switch; 3. A small input inductor current ripple is implemented so that a smaller EMI level may be selected and used; 4. By the resonance of the internal resonant tank, the parasitic capacitance of the switch to be turned on can be discharged during the dead time of the switch so that it can achieve zero voltage conduction; 5. The zero-voltage switching is implemented to reduce heat dissipation requirements for switch modules; 6. The zero-voltage switching increases the switching frequency and reduces the size of the magnetic components; 7. The integrated coupling structure with the resonant inductor and the input inductor is used to acquire the benefits of magnetic flux cancellation so as to increase efficiency while increasing integration and power density; 8. Under the uses of coupling inductors, no additional magnetic component and no additional cost are required.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
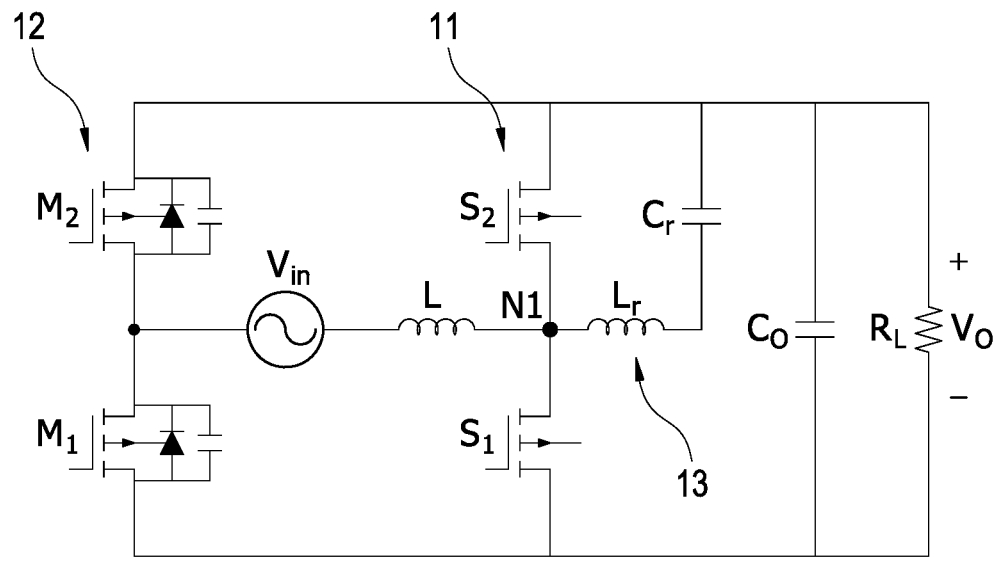
FIG. 1A is a circuit diagram of a Totem-Pole power factor corrector with zero-voltage switching according to a first embodiment of the present disclosure.

Reference will now be made to the drawing figures to describe the present disclosure in detail. It will be understood that the drawing figures and exemplified embodiments of present disclosure are not limited to the details thereof.

Figure 1B:
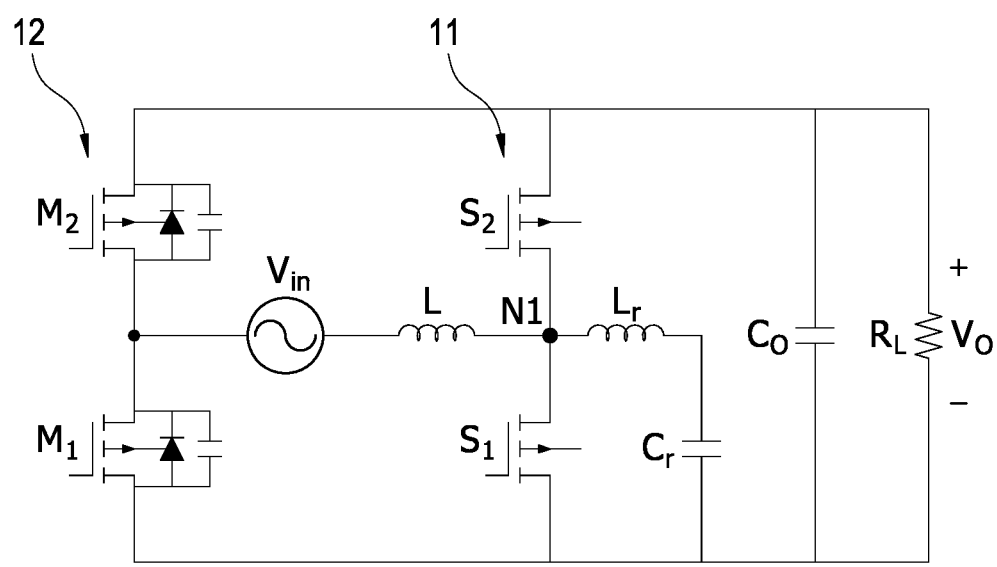
FIG. 1B is a circuit diagram of the Totem-Pole power factor corrector with zero-voltage switching according to a second embodiment of the present disclosure.
Figure 1C:
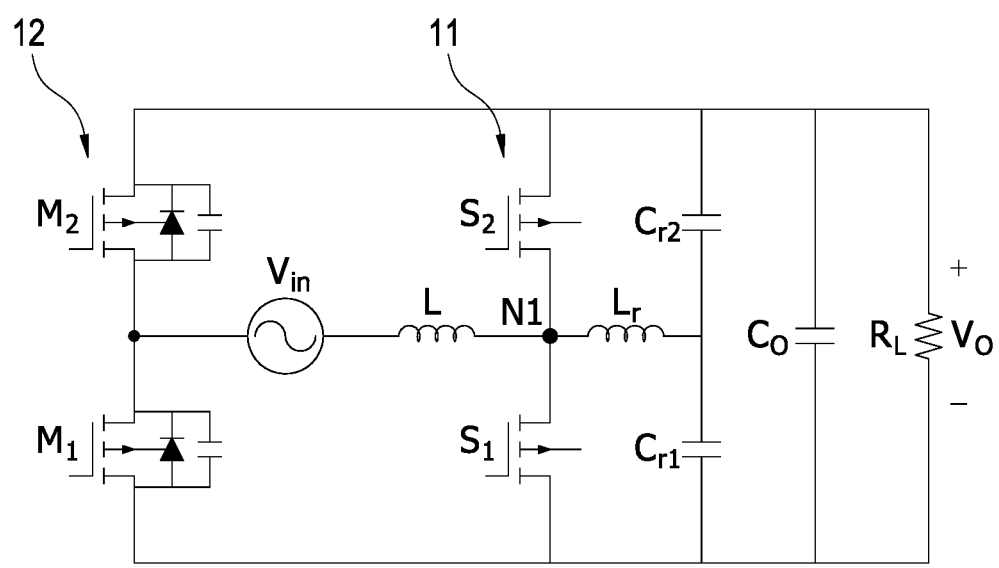
FIG. 1C is a circuit diagram of the Totem-Pole power factor corrector with zero-voltage switching according to a third embodiment of the present disclosure.

Please refer to FIG. 1A, FIG. 1B, and FIG. 1C, which respectively show circuit diagrams of a Totem-Pole power factor corrector with zero-voltage switching according to three embodiments of the present disclosure. The Totem-Pole power factor corrector with zero-voltage switching (hereinafter referred to as Totem-Pole power factor corrector) receives an input power source Vin and converts the input power source Vin into an output power source Vo. In this embodiment, the input power source Vin is an AC power source, and the converted output power Vo is a DC power source.

The Totem-Pole power factor corrector includes an input inductor L, a fast-switching switch leg 11, a slow-switching switch leg 12, a resonant tank 13, and an output capacitor Co.

The input inductor L has a first end and a second end. The first end of the input inductor L receives the input power source Vin, i.e., the AC power source. The fast-switching switch leg 11 includes a fast-switching upper switch $S_2$ and a fast-switching lower switch $S_1$, and the fast-switching upper switch $S_2$ and the fast-switching lower switch $S_1$ are commonly coupled at a first middle node N1. In this embodiment, the fast-switching switch leg 11 is coupled to the AC input power source Vin through the input inductor L. The slow-switching switch leg 12 is coupled in parallel to the fast-switching switch leg 11. The slow-switching switch leg 12 includes a slow-switching upper switch $M_2$ and a slow-switching lower switch $M_1$. In this embodiment, the slow-switching switch leg 12 is directly coupled to the AC input power source Vin, and is controlled by a frequency of the mains (i.e., the frequency of the AC input power source Vin).

A first end of the fast-switching upper switch $S_2$ and a first end of the fast-switching lower switch $S_1$ are commonly coupled at the first middle node N1. A first end of the slow-switching upper switch $M_2$ and a first end of the slow-switching lower switch $M_1$ are commonly coupled to the input power source Vin. A second end of the fast-switching upper switch $S_2$ is coupled to a second end of the slow-switching upper switch $M_2$, and a second end of the fast-switching lower switch $S_1$ is coupled to a second end of the slow-switching lower switch $M_1$. Therefore, a dual-level structure is formed through this circuit topology.

The resonant tank 13 includes a resonant inductor $L_r$ and at least one resonant capacitor $C_r$, $C_{r1}$, $C_{r2}$. A first end of the resonant inductor $L_r$ is coupled to the first middle node N1, and a second end of the resonant inductor $L_r$ is coupled to the at least one resonant capacitor $C_r$, $C_{r1}$, $C_{r2}$. The output capacitor Co is coupled in parallel to the fast-switching switch leg 11, and outputs the output power source Vo.

In the first embodiment shown in FIG. 1A, the number of the at least one resonant capacitor is one. A first end of the resonant capacitor $C_r$ is coupled to the second end of the resonant inductor $L_r$, and a second end of the resonant capacitor $C_r$ is coupled to the fast-switching upper switch $S_2$ and the slow-switching upper switch $M_2$.

In the second embodiment shown in FIG. 1B, the number of the at least one resonant capacitor is one. A first end of the resonant capacitor $C_r$ is coupled to the second end of the resonant inductor $L_r$, and a second end of the resonant capacitor $C_r$ is coupled to the fast-switching lower switch $S_1$ and the slow-switching lower switch $M_1$.

In the third embodiment shown in FIG. 1C, the number of the at least one resonant capacitor is two, which are a first resonant capacitor $C_{r1}$ and a second resonant capacitor $C_{r2}$. A first end of the first resonant capacitor $C_{r1}$ and a first end of the second resonant capacitor $C_{r2}$ are coupled to the second end of the resonant inductor $L_r$. A second end of the first resonant capacitor $C_{r1}$ is coupled to the fast-switching lower switch $S_1$ and the slow-switching lower switch $M_1$. A second end of the second resonant capacitor $C_{r2}$ is coupled to the fast-switching upper switch $S_2$ and the slow-switching upper switch $M_2$.

In particular, in the third embodiment shown in FIG. 1C, since two resonant capacitors $C_{r1}$, $C_{r2}$ are used, a cross voltage of each resonant capacitor $C_{r1}$, $C_{r2}$ may be relatively low, which is about half of a cross voltage of a single resonant capacitor in FIG. 1A and FIG. 1B. Therefore, the selected capacitance value of each resonant capacitor $C_{r1}$, $C_{r2}$ may be relatively small. In one embodiment, the capacitance value of each resonant capacitor $C_{r1}$, $C_{r2}$ is the same and half of the original, and therefore the current stress of each resonant capacitor $C_{r1}$, $C_{r2}$ is only half of that of the single resonant capacitor.

Moreover, in the circuit structure of the third embodiment, the two resonant capacitors $C_{r1}$, $C_{r2}$ provide two current paths for the inductor current (that is, the current flowing through the resonant inductor $L_r$) so that the service life of each resonant capacitor $C_{r1}$, $C_{r2}$ may be increased.

In summary, the present disclosure enables the fast-switching upper switch $S_2$ and the fast-switching lower switch $S_1$ of the fast-switching switch leg 11 to have zero-voltage switching by adding an LC resonant tank and a power inductor (that is, the input inductor L). It is characterized in that under the TPPFC (Totem-Pole power factor corrector) structure, the resonant inductor Lr is connected between the half-bridge switch and the input inductor L, and then is connected in series to the resonant capacitor $C_r$ to a positive end or a negative end of the DC output capacitor Co, or then is connected to the two resonant capacitors $C_{r1}$, $C_{r2}$ to the positive end and the negative end of the DC output capacitor Co.

Figure 2:
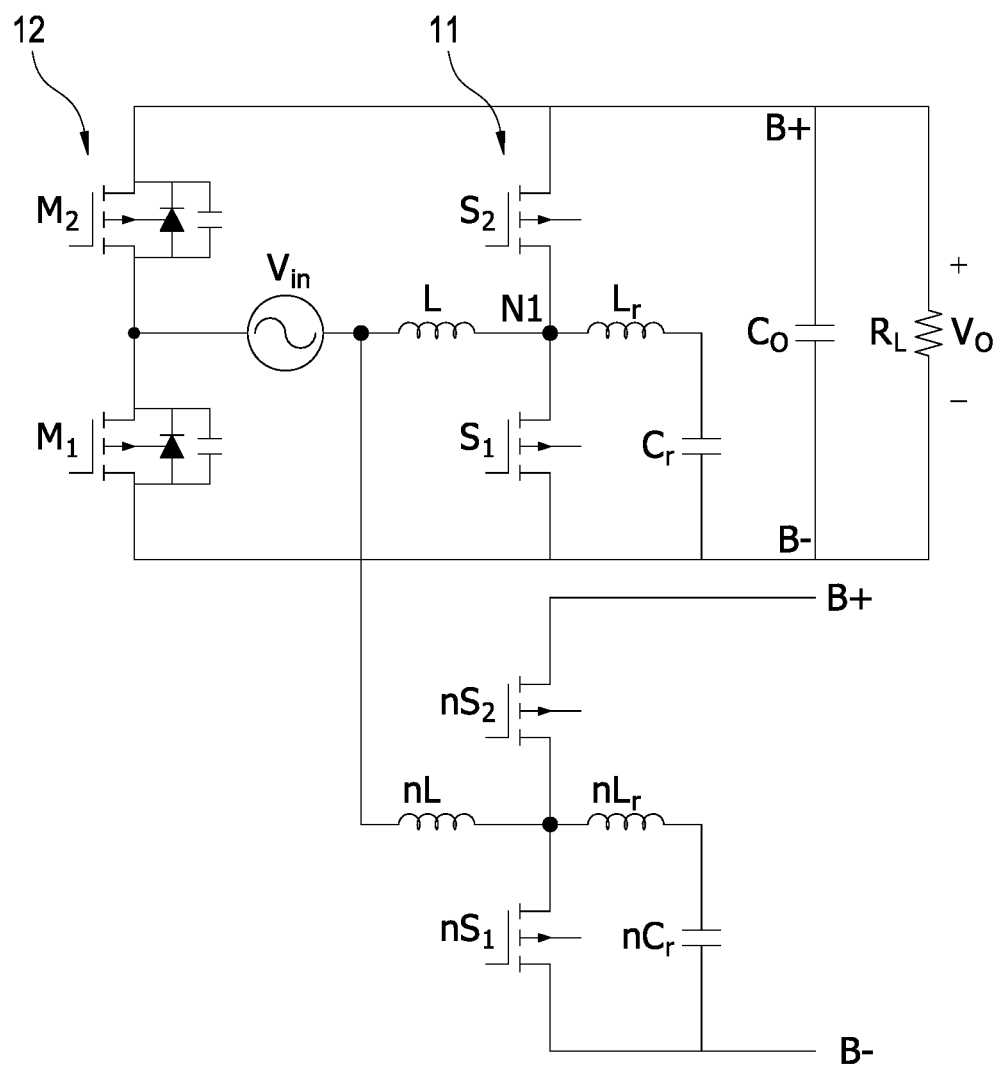
FIG. 2 is a block circuit diagram of the Totem-Pole power factor corrector with zero-voltage switching operating in a multi-phase parallel structure according to the present disclosure.

Please refer to FIG. 2, which shows a block circuit diagram of the Totem-Pole power factor corrector with zero-voltage switching operating in a multi-phase parallel structure according to the present disclosure. Different from FIG. 1A to FIG. 1C, the Totem-Pole power factor corrector with zero-voltage switching of the present disclosure is applied to a single-phase structure, and the present disclosure may also realize the multi-phase parallel structure shown in FIG. 2. Specifically, as shown in FIG. 2, when the Totem-Pole power factor corrector operates in a N-phase structure, the N-phase Totem-Pole power factor corrector includes N sets of the input inductors L, N sets of the fast-switching switch legs 11, and N sets of the resonant tanks 13, and one set of the slow-switching switch leg 12 and one set of the output capacitor Co. As shown in FIG. 2, nL represents the Nth set of input inductor L, $nS_1$ represents the fast-switching lower switch $S_1$ of the Nth set of fast-switching switch leg 11, $nS_2$ represents the fast-switching upper switch $S_2$ of the Nth set of fast-switching switch leg 11, $nL_r$ represents the resonant inductor Lr of the Nth set of resonant tank 13, and $nC_r$ represents the resonant capacitor $C_r$ of the Nth set of resonant tank 13. In particular, the output of the Nth set of circuit structure shown in FIG. 2 is coupled to both ends of the output capacitor Co (respectively indicated by B+ and B−). Therefore, under the multi-phase parallel structure, the interleaved phase control can be used to make the ripple components of the input current be reduced because of counteracting the ripple components to each other.

Figure 3A:
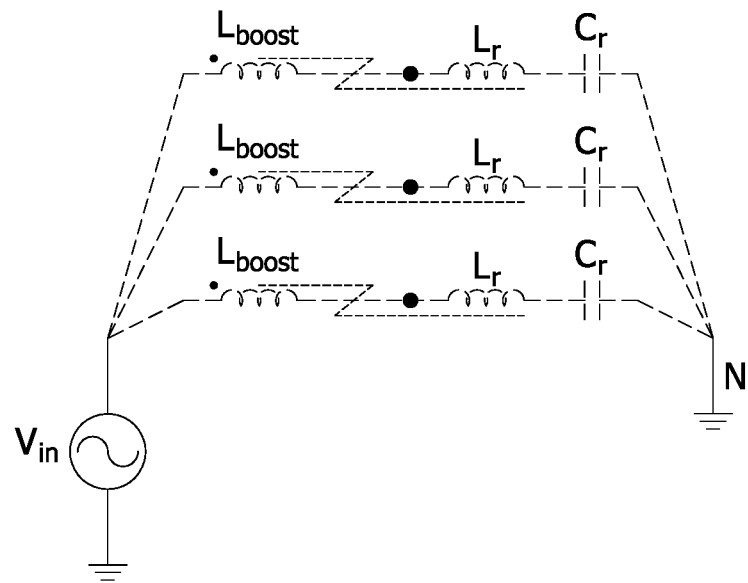
FIG. 3A is a circuit diagram of an inductor coupling of the Totem-Pole power factor corrector with zero-voltage switching operating in the multi-phase parallel structure according to a first embodiment of the present disclosure.
Figure 3B:
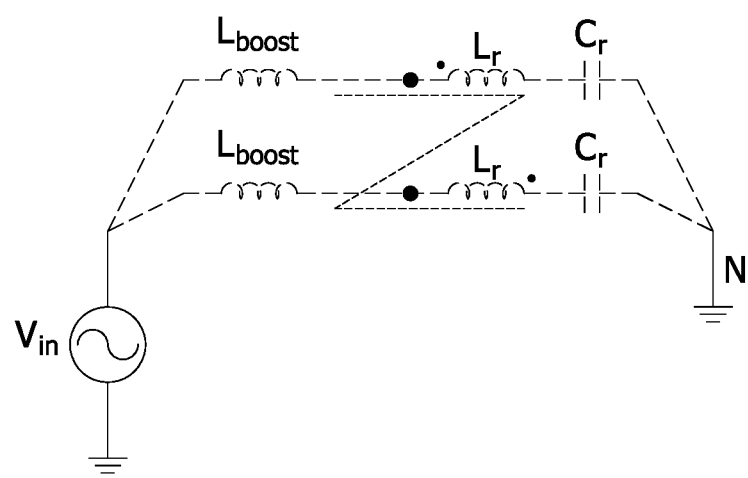
FIG. 3B is a circuit diagram of the inductor coupling of the Totem-Pole power factor corrector with zero-voltage switching operating in the multi-phase parallel structure according to a second embodiment of the present disclosure.

Under the multi-phase parallel structure shown in FIG. 2, the inductor coupling has different embodiments. Please refer to FIG. 3A, which shows a circuit diagram of an inductor coupling of the Totem-Pole power factor corrector with zero-voltage switching operating in the multi-phase parallel structure according to a first embodiment of the present disclosure. Specifically, the input inductor Lboost in each phase is correspondingly coupled with the resonant inductor $L_r$ of the resonant tank 13. Alternatively, please refer to FIG. 3B, which shows a circuit diagram of the inductor coupling of the Totem-Pole power factor corrector with zero-voltage switching operating in the multi-phase parallel structure according to a second embodiment of the present disclosure. Specifically, two resonant inductors $L_r$ between two phases are cross-coupled.

Figure 4:
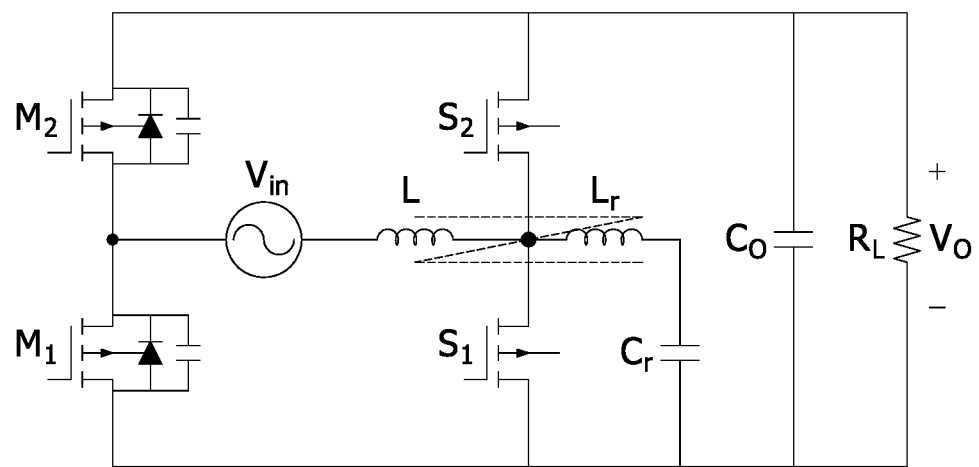
FIG. 4 is a circuit diagram of the inductor coupling of the Totem-Pole power factor corrector with zero-voltage switching operating in a single-phase parallel structure according to the present disclosure.

Please refer to FIG. 4, which shows a circuit diagram of the inductor coupling of the Totem-Pole power factor corrector with zero-voltage switching operating in a single-phase parallel structure according to the present disclosure. In the present disclosure, the input inductor L and the resonant inductor $L_r$ are two different inductors or two sets of coils are wound on two different iron cores. Alternatively, the input inductor L and the resonant inductor $L_r$ form an integrated coupling structure, that is, the input inductor L and the resonant inductor $L_r$ share the same iron core, and achieve an integrated structure of the common coupling magnetic path as shown in FIG. 4.

Therefore, the Totem-Pole power factor corrector with zero-voltage switching is used to add at least one set of LC resonant tank to the circuit structure of the existing Totem-Pole power factor corrector (TPPFC), thereby solving the disadvantages of the existing technology under the continuous conduction mode (CCM) operation.

In summary, the present disclosure has the following features and advantages:

1. The LC resonant tank is added to make the Totem-Pole power factor corrector have full switch zero-voltage switching function, thereby reducing switching loss to increase power conversion efficiency.

2. The LC resonant tank is added to accelerate the release of the electric energy stored in the parasitic capacitance of the switch, thereby suppressing the surge when the switch is switched to protect the switch.

3. A small input inductor current ripple is implemented so that a smaller EMI level may be selected and used.

4. By the resonance of the internal resonant tank, the parasitic capacitance of the switch to be turned on can be discharged during the dead time of the switch so that it can achieve zero voltage conduction.

5. The zero-voltage switching is implemented to reduce heat dissipation requirements for switch modules.

6. The zero-voltage switching increases the switching frequency and reduces the size of the magnetic components.

7. The integrated coupling structure with the resonant inductor and the input inductor is used to acquire the benefits of magnetic flux cancellation so as to increase efficiency while increasing integration and power density.

8. Under the uses of coupling inductors, no additional magnetic component and no additional cost are required.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A Totem-Pole power factor corrector with zero-voltage switching, configured to receive an input power source and convert the input power source into an output power source, the Totem-Pole power factor corrector comprising:

an input inductor, a first end of the input inductor configured to receive the input power source, a fast-switching switch leg, comprising a fast-switching upper switch and a fast-switching lower switch, and the fast-switching upper switch and the fast-switching lower switch commonly coupled at a first middle node, a slow-switching switch leg, coupled in parallel to the fast-switching switch leg, and the slow-switching switch leg comprising a slow-switching upper switch and a slow-switching lower switch, a resonant tank, comprising a resonant inductor and at least one resonant capacitor; a first end of the resonant inductor coupled to the first middle node, and a second end of the resonant inductor coupled to the at least one resonant capacitor, and an output capacitor, coupled in parallel to the fast-switching switch leg, and configured to output the output power source.

2. The Totem-Pole power factor corrector as claimed in claim 1, wherein the number of the at least one resonant capacitor is one; a first end of the resonant capacitor is coupled to the second end of the resonant inductor, and a second end of the resonant capacitor is coupled to the fast-switching upper switch and the slow-switching upper switch.

3. The Totem-Pole power factor corrector as claimed in claim 1, wherein the number of the at least one resonant capacitor is one; a first end of the resonant capacitor is coupled to the second end of the resonant inductor, and a second end of the resonant capacitor is coupled to the fast-switching lower switch and the slow-switching lower switch.

4. The Totem-Pole power factor corrector as claimed in claim 1, wherein the number of the at least one resonant capacitor is two, which are a first resonant capacitor and a second resonant capacitor; a first end of the first resonant capacitor and a first end of the second resonant capacitor are coupled to the second end of the resonant inductor; a second end of the first resonant capacitor is coupled to the fast-switching lower switch and the slow-switching lower switch; a second end of the second resonant capacitor is coupled to the fast-switching upper switch and the slow-switching upper switch.

5. The Totem-Pole power factor corrector as claimed in claim 1, wherein a first end of the fast-switching upper switch and a first end of the fast-switching lower switch are commonly coupled to the first middle node; a first end of the slow-switching upper switch and a first end of the slow-switching lower switch are commonly coupled to the input power source; a second end of the fast-switching upper switch is coupled to a first end of the slow-switching upper switch; a second end of the fast-switching lower switch is coupled to a second end of the slow-switching lower switch.

6. The Totem-Pole power factor corrector as claimed in claim 1, wherein the input inductor and the resonant inductor form an integrated coupling structure.

7. The Totem-Pole power factor corrector as claimed in claim 1, wherein the Totem-Pole power factor corrector operates in a N-phase structure;

the N-phase Totem-Pole power factor corrector comprises:
N sets of the input inductors, N sets of the fast-switching switch legs, and N sets of the resonant tanks, and
one set of the slow-switching switch leg and one set of the output capacitor.

8. The Totem-Pole power factor corrector as claimed in claim 7, wherein the input inductor in each phase is correspondingly coupled with the resonant inductor of the resonant tank.

9. The Totem-Pole power factor corrector as claimed in claim 7, wherein the two resonant inductors between two phases are cross-coupled.

* * * * *